Sept. 10, 1940.  W. O. LANGILLE  2,214,696
ELECTRICAL CONDUCTOR SUPPORT
Filed March 25, 1940
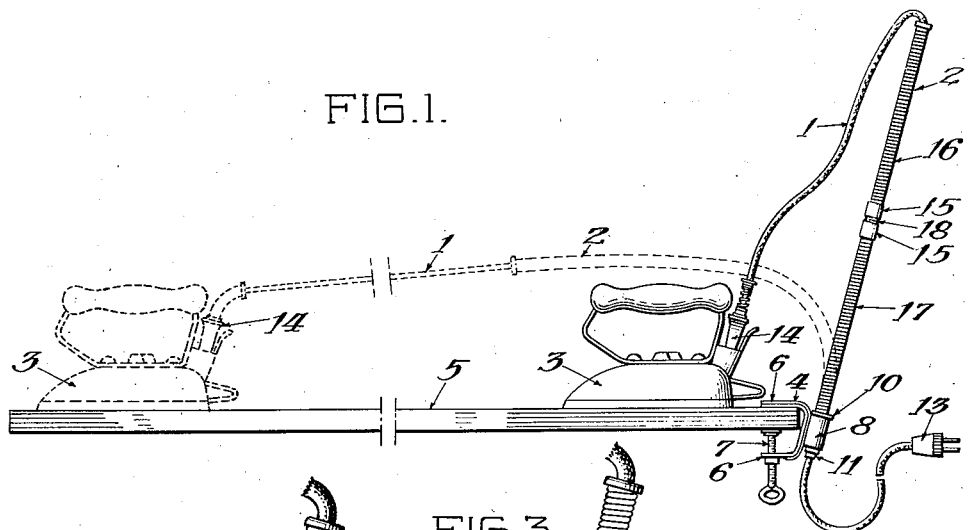
FIG.1.
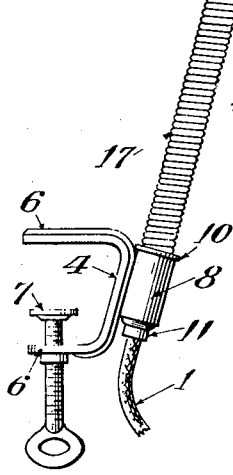
FIG.2.
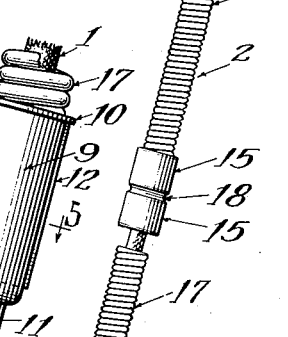
FIG.3.
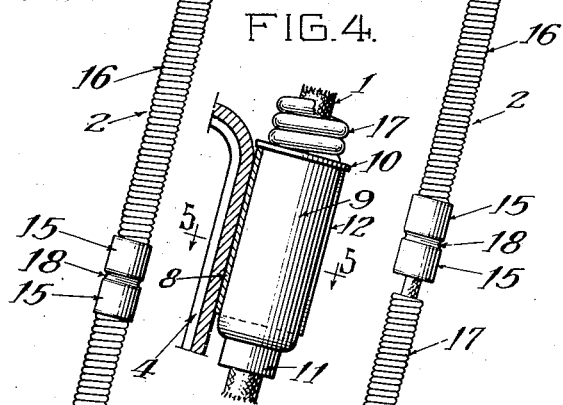
FIG.4.
FIG.5. FIG.7.
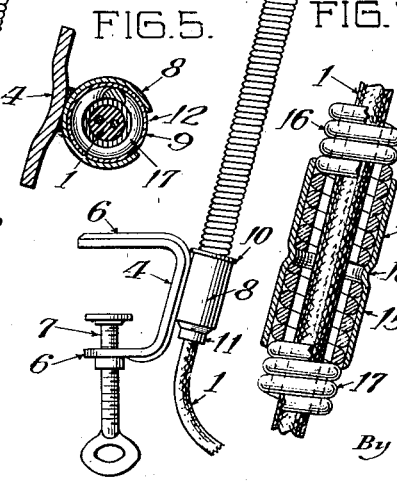
FIG.8.
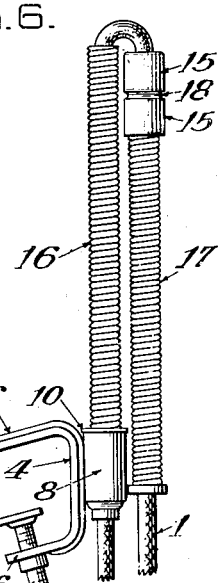
FIG.6.
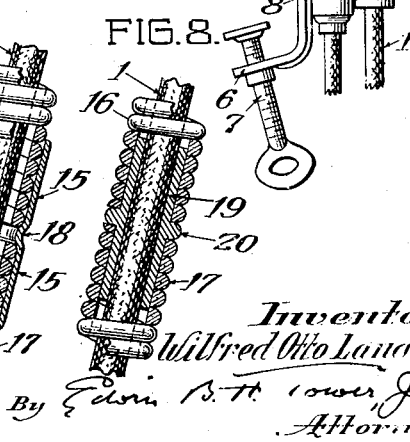
Inventor:
Wilfred Otto Langille
By Edwin B. H. Tower Jr.
Attorney.

Patented Sept. 10, 1940

2,214,696

UNITED STATES PATENT OFFICE 2,214,696

ELECTRICAL CONDUCTOR SUPPORT

Wilfred Otto Langille, Chester Township, Morris County, N. J., assignor to The Singer Manufacturing Company, New York, N. Y., a corporation of New Jersey Application March 25, 1940, Serial No. 325,796

4 Claims. (Cl. 248—51)

The invention relates to an electrical conductor support of the type employed to guide a flexible conducting cord connecting an electric iron or other portable electric appliance to an electric supply terminal.

The particular electrical conductor support to which the invention is ordinarily applied is provided with a resilient tubular staff carried by a fixed support and a flexible conducting cord passing through the staff.

When the electric iron is in service and moved back and forth, the staff is deflected by the pull exerted upon its top by the conducting cord and thereby a counterpull is exerted upon the conducting cord to keep it taut.

The present invention has for its object to provide an electrical conductor support which is provided with a staff to deflect through a wide range but which may be collapsed into a compact bundle for storage and transportation.

Another object is to provide an electrical conductor support which will remain intact upon its being collapsed into a compact bundle and which will have its component parts kept from being lost or misplaced.

Another object is to provide an electrical conductor support which may be readily placed in service after it has been collapsed into a compact bundle for storage or transportation.

According to the present invention as it is ordinarily embodied in practice, the electrical conductor support is provided with a resilient tubular staff severable at a joint between its end into separate longitudinal sections and a conducting cord passing through the staff and having the sections strung thereon upon separation from each other to keep the entire electrical conductor support intact and facilitate joining its sections together.

The electrical conductor support illustrated in the accompanying drawing exemplifies the invention as it is at present embodied in practice, and the views in the drawing are as follows:

Fig. 1 is an elevation of the electrical conductor support as it is employed in service to guide a flexible conducting cord connecting an electric iron to a fixed electric supply terminal.

Fig. 2 is an elevation of the electrical conductor support having its sections coupled together.

Fig. 3 is an elevation of the electrical conductor support having its sections uncoupled.

Fig. 4 is an elevation of the socket upon a bracket to carry the staff.

Fig. 5 is a transverse section on the line 5—5 of Fig. 4.

Fig. 6 is an elevation showing the electrical conductor collapsed to place the separated sections of the staff side by side.

Fig. 7 is a sectional elevation showing the staff having its sections coupled by an external ferrule.

Fig. 8 is a sectional elevation showing the staff having its sections coupled by an internal ferrule.

The electrical conductor support as illustrated is, in general, of the type which is employed to guide and keep taut a flexible conducting cord or electrical conductor 1, and it is provided with a resilient tubular staff 2.

The conducting cord connects an electric iron 3 or other portable electric appliance to an electric supply terminal.

The staff is carried by a bracket 4 at its lower end to attach it to an ironing board 5 or other support, and it is deflectible at its upper end to keep the conducting cord taut in moving the electric iron back and forth upon the ironing board.

The bracket has jaws 6 to embrace the ironing board and it is fastened in place upon the ironing board by a clamping screw 7.

The staff is attached to the bracket by its base setting into a tubular socket 8 upon the bracket and its base having a thimble 9 attached thereto and fitting within the socket.

The thimble has a flange 10 to bear upon the upper edge of the socket and an insulating bushing 11 to protect the conducting cord.

The staff is detachable from the bracket by retracting the thimble from the socket and then slipping the conducting cord through an axial slot 12 in the side of the socket.

The flexible conducting cord is provided with a detachable terminal connector 13 to connect it to a fixed terminal connector attached to a support and a detachable terminal connector 14 to connect it to a terminal connector attached to the electric iron.

The staff is jointed at its middle by a detachable coupling 15 to make it severable into a lower longitudinal section 16 and an upper longitudinal section 17.

These sections are each formed by a helical spring wire and possess sufficient resiliency to restore the staff to its normal position upon deflection therefrom by the conducting cord exerting a pull thereon upon moving the electric iron away from the staff.

Fig. 7 shows the sections of the staff coupled by an external coupling ferrule extending over the adjoining ends of the sections and having an interior bead 18 between these adjoining ends.

The coupling ferrule is attached to the bottom of the upper section and provided with a socket to receive the top of the lower section.

Fig. 8 shows the sections of the staff coupled by a modified detachable coupling 19 formed by an internal coupling ferrule inserted into the adjoining ends of the sections and having an exterior bead 20 between these adjoining ends.

The modified coupling ferrule is attached to the bottom of the upper section and provided with a plug to insert into the top of the lower section.

The electrical conductor support is provided with a staff that is elongated to deflect to a sufficient extent to keep the conducting cord taut in moving the electric iron through a wide range, but it may be collapsed into a compact bundle for storage or transportation by detaching the coupling and folding the conducting cord between the sections.

When the staff is disjointed by detaching its coupling, its sections remain strung upon the conducting cord to keep the electrical conductor support as an entirety intact and ready for service by merely coupling the sections of the staff together.

The terminal connectors are made of sufficient size to retain the sections of the staff upon the conducting cord.

The conducting cord passing through the uncoupled sections of the staff facilitates coupling the sections together, as it serves as a guide to bring the adjoining ends of the sections into alinement to attach the coupling.

When the sections are separated by detaching the coupling, the electrical conductor support may be arranged in a compact bundle for storage or transportation by folding it between the separated sections to place the sections side by side, as shown in Fig. 6, and winding the conducting cord upon the sections.

The invention which is described herein may be embodied in various ways which will be within the scope thereof as defined by the appended claims.

The invention described in the foregoing specification is hereby claimed as follows:

1. An electrical conductor support, comprising in combination, a resilient tubular staff composed of longitudinal sections separable from each other to collapse said staff and each formed by a helical wire and possessing sufficient resiliency to restore said staff to its normal position upon deflection therefrom, a coupling joining said sections together in axial alinement and detachable to disjoin said sections from each other, and a flexible electrical conductor passing through said staff to string said sections together upon detaching said coupling and serving to facilitate attaching said coupling to join said sections together.

2. An electrical conductor support, comprising in combination, a resilient tubular staff composed of longitudinal sections separable from each other to collapse said staff and each formed by a helical wire and possessing sufficient resiliency to restore said staff to its normal position upon deflection therefrom, a ferrule joining said sections together in axal alinement and attached to one section and detachable from the other section, and a flexible electrical conductor passing through said staff to string said sections together upon detaching said ferrule and serving to facilitate attaching said ferrule to join said sections together.

3. An electrical conductor support, comprising in combination, a resilient staff composed of longitudinal sections separable from each other to collapse said staff and each possessing sufficient resiliency to restore said staff to its normal position upon deflection therefrom, a coupling joining said sections together in axial alinement and detachable to disjoin said sections from each other, and a flexible electrical conductor passing through said staff to string said sections together upon detaching said coupling and serving to facilitate attaching said coupling to join said sections together.

4. An electrical conductor support, comprising in combination, a resilient staff composed of longitudinal sections separable from each other to collapse said staff and each possessing sufficient resiliency to restore said staff to its normal position upon deflection therefrom, a ferrule joining said sections together in axial alinement and attached to one section and detachable from the other section, and a flexible electrical conductor passing through said staff to string said sections together upon detaching said ferrule and serving to facilitate attaching said ferrule to join said sections together.

WILFRED OTTO LANGILLE.